(12) United States Patent
Lin

(10) Patent No.: US 11,906,102 B2
(45) Date of Patent: Feb. 20, 2024

(54) TURNTABLE BRACKET AND PANEL PROTECTING SHELL USING SAME

(71) Applicant: Guangzhou Roiskin Technology Company, Guangdong (CN)

(72) Inventor: Yuying Lin, Guangdong (CN)

(73) Assignee: Guangzhou Roiskin Technology Company, Guangzhou (CN)

( * ) Notice: Subject to any disclaimer, the term of this patent is extended or adjusted under 35 U.S.C. 154(b) by 265 days.

(21) Appl. No.: 17/561,672

(22) Filed: Dec. 23, 2021

(65) Prior Publication Data
US 2023/0167940 A1 Jun. 1, 2023

(30) Foreign Application Priority Data
Nov. 26, 2021 (CN) .......................... 202122946196.1

(51) Int. Cl.
| | | |
|---|---|---|
| F16M 11/10 | (2006.01) | |
| F16M 11/18 | (2006.01) | |
| F16M 13/00 | (2006.01) | |
| G06F 1/16 | (2006.01) | |
| A45C 11/00 | (2006.01) | |

(52) U.S. Cl.
CPC ........... *F16M 11/105* (2013.01); *A45C 11/00* (2013.01); *F16M 11/18* (2013.01); *F16M 13/005* (2013.01); *G06F 1/166* (2013.01); *A45C 2011/003* (2013.01); *G06F 2200/1633* (2013.01)

(58) Field of Classification Search
CPC .... F16M 11/105; F16M 11/18; F16M 13/005; A45C 11/00; A45C 2011/003; G06F 1/166; G06F 2200/1633
See application file for complete search history.

(56) References Cited

U.S. PATENT DOCUMENTS

| | | | | |
|---|---|---|---|---|
| 8,534,635 | B2 * | 9/2013 | Yang ...................... | F16M 11/10 248/458 |
| 8,897,033 | B2 * | 11/2014 | Slipy .................... | H04M 1/0202 361/679.01 |
| 9,448,583 | B1 * | 9/2016 | Lee ........................... | E05F 5/02 |
| 10,274,814 | B2 * | 4/2019 | Jeon ...................... | F16M 13/022 |
| 10,362,697 | B2 * | 7/2019 | Yuan ...................... | F16M 11/38 |
| 11,039,679 | B2 * | 6/2021 | Jang ........................ | A45C 11/00 |
| 11,290,142 | B2 * | 3/2022 | Ferrantello .......... | H04B 1/3888 |
| 11,552,668 | B1 * | 1/2023 | Miller ................... | G06F 1/1632 |
| 2005/0254203 | A1 * | 11/2005 | Choi ...................... | F16M 11/105 361/679.27 |
| 2012/0102675 | A1 * | 5/2012 | Lee ........................ | G06F 1/1681 16/243 |

(Continued)

*Primary Examiner* — Monica E Millner

(57) ABSTRACT

A turntable bracket, the turntable portion is provided with the protruding connecting seat to mount the rotating shaft assembly, and the rotating shaft assembly is embedded from a back surface of the connecting seat and is compressed and fixed via the pressing plate assembly, so that it is convenient to assemble the turntable bracket, it is firmer to connect, and the service life is longer; A panel protecting shell using the turntable bracket, the turntable through hole is internally provided with the slots and the elastic clamping points of the turntable portion matched to position the angle of the turntable portion, and meanwhile, the angle of the bracket portion is positioned by opening the rotating shaft assembly on the turntable bracket at an angle, so that the panel protecting shell is opened at any angle.

9 Claims, 6 Drawing Sheets

(56) References Cited

U.S. PATENT DOCUMENTS

| | | | |
|---|---|---|---|
| 2014/0298616 A1* | 10/2014 | Baer | E05D 11/0054 |
| | | | 16/250 |
| 2014/0347793 A1* | 11/2014 | Gao | H05K 5/03 |
| | | | 361/679.01 |
| 2015/0257288 A1* | 9/2015 | Livernois | H04B 1/3877 |
| | | | 248/346.06 |
| 2018/0013463 A1* | 1/2018 | Jeon | H04M 1/04 |
| 2021/0227960 A1* | 7/2021 | Carnevali | A45F 5/10 |
| 2022/0117384 A1* | 4/2022 | Whitten | F16M 11/10 |
| 2023/0092192 A1* | 3/2023 | Jia | H04B 1/3877 |
| | | | 455/575.1 |

* cited by examiner

US 11,906,102 B2

TURNTABLE BRACKET AND PANEL PROTECTING SHELL USING SAME

CROSS REFERENCE TO RELATED APPLICATIONS

The present application claims the benefit of Chinese Patent Application No. 202122946196.1 filed on Nov. 26, 2021, the contents of which are incorporated herein by reference in their entirety.

BACKGROUND OF THE INVENTION

1. Technical Field

The present invention belongs to the technical field of electronic product protecting equipment, and more in particular relates to a turntable bracket and a panel protecting shell using the same.

2. Description of Related Art

Most tablet computer cases on the present market have only one function, and support tablet computers at several fixed angles by means of a support, thus being unable to meet the requirements of different users for supporting table computers at different angles during use.

An existing multi-angle turntable bracket structure is complex in structure in a connecting pivot position, is inconvenient to assemble and is easy to damage after long-term use.

BRIEF SUMMARY OF THE INVENTION

A major objective of the present invention is to provide a turntable bracket and a panel protecting shell using the same. The manufacturing cost can be saved by simplifying the structure of the bracket effectively, and the bracket can be unfolded at any angle for the convenience in use.

A turntable bracket, including a turntable portion and a bracket portion in hinged connection with the turntable portion, where the turntable portion is provided with a protruding connecting seat, the connecting seat is internally provided with a rotating shaft assembly and a pressing plate assembly for fixing the rotating shaft assembly; the rotating shaft assembly includes a rotating shaft, two ends of which stretch out respectively from the connecting seat; and the bracket portion is provided with disconnected connectors, the connectors are formed in two sides of the connecting seat, and two ends of each of the connectors are respectively connected with two ends of the rotating shaft.

A turntable bracket, the rotating shaft assembly includes a mounting plate and the rotating shaft, where an end portion of the mounting plate is curled to form a rotating shaft sleeve, an inner circumference of the rotating shaft sleeve is provided with a flat shaft sleeve stop position, the rotating shaft is provided with a flatly arranged rotating stop position, and the rotating stop position fitting the shaft sleeve stop position locks the rotating shaft.

A turntable bracket, the pressing plate assembly is connected with the connecting seat via a screw, and the screw penetrates through the pressing plate assembly and the mounting plate and is fixed to the connecting seat.

A turntable bracket, a side surface of the connecting seat is connected with a pen cap, a side surface of the pen cap is provided with a pen cap mounting portion, a side surface of the connecting seat is provided with a pen cap mounting hole, and the pen cap mounting portion penetrates through the pen cap mounting hole and is connected in the connecting seat.

A turntable bracket, the pressing plate assembly is provided with a connecting column, the pen cap mounting portion is provided with the pen cap mounting hole, and the connecting column penetrates through the pen cap mounting hole and is connected with the pen cap.

A turntable bracket, the turntable portion includes a first turntable and a second turntable, the first turntable and the second turntable being in buckled connection to mount the turntable portion.

A turntable bracket, several elastic clamping points are arranged outside the second turntable at an equal radian.

A turntable bracket, the bracket portion includes a first bracket and a second bracket. The first bracket and the second bracket are buckled to form the bracket portion. An outer frame of the bracket portion includes several linear supporting edges, each of the linear supporting edges enables an external contour of the bracket portion to be polygonal, and a center of the bracket portion is provided with a portable through hole.

A panel protecting shell using the turntable bracket, including a protecting shell body, where the protecting shell body is provided with a turntable through hole, the turntable bracket is mounted at the turntable through hole, and the turntable bracket is mounted on two sides of the turntable through hole in a buckled manner.

A panel protecting shell, the turntable through hole is internally provided with several slots, a periphery of the turntable portion is provided with several elastic clamping points at an equal radian, and each of the elastic clamping points is embedded into the slot to be positioned in a rotating process.

One of the above-mentioned technical solutions of the invention has at least one of the following advantages or beneficial effects:

According to the turntable bracket, the turntable portion is provided with the protruding connecting seat to mount the rotating shaft assembly, and the rotating shaft assembly is embedded from a back surface of the connecting seat and is compressed and fixed via the pressing plate assembly, so that it is convenient to assemble the turntable bracket, it is firmer to connect, and the service life is longer;

According to the panel protecting shell using the turntable bracket, the turntable through hole is internally provided with the slots and the elastic clamping points of the turntable portion matched to position the angle of the turntable portion, and meanwhile, the angle of the bracket portion is positioned by opening the rotating shaft assembly on the turntable bracket at an angle, so that the panel protecting shell is opened at any angle.

BRIEF DESCRIPTION OF THE SEVERAL VIEWS OF THE DRAWINGS

Further description of the present invention will be made below in combination with drawings and embodiments.

DETAILED DESCRIPTION OF THE INVENTION

Different embodiments or examples are provided below to implement different solutions of the invention.

Figure 1:
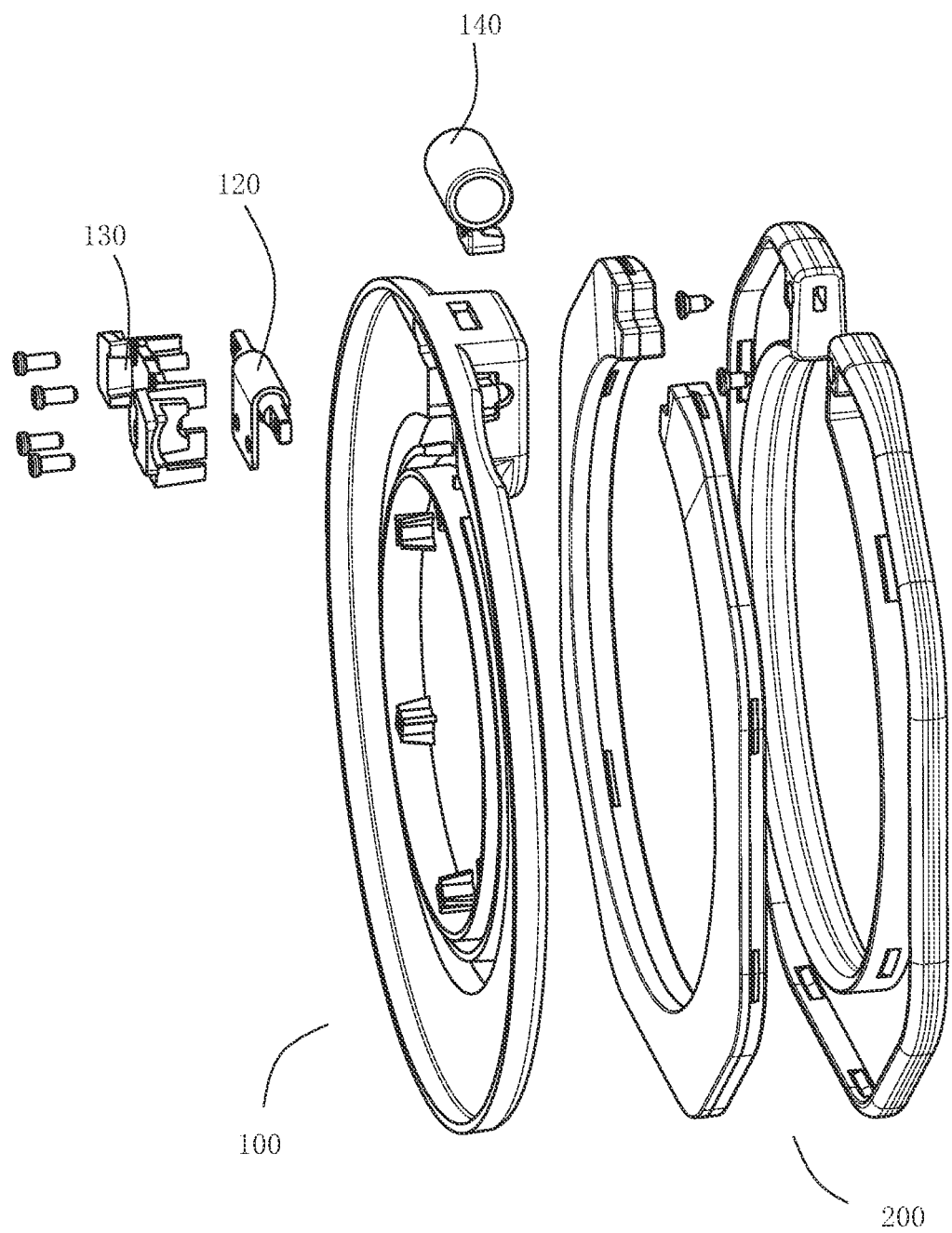
FIG. 1 is a schematic diagram of a breakdown structure of a turntable bracket in a first embodiment of the present invention.
Figure 2:
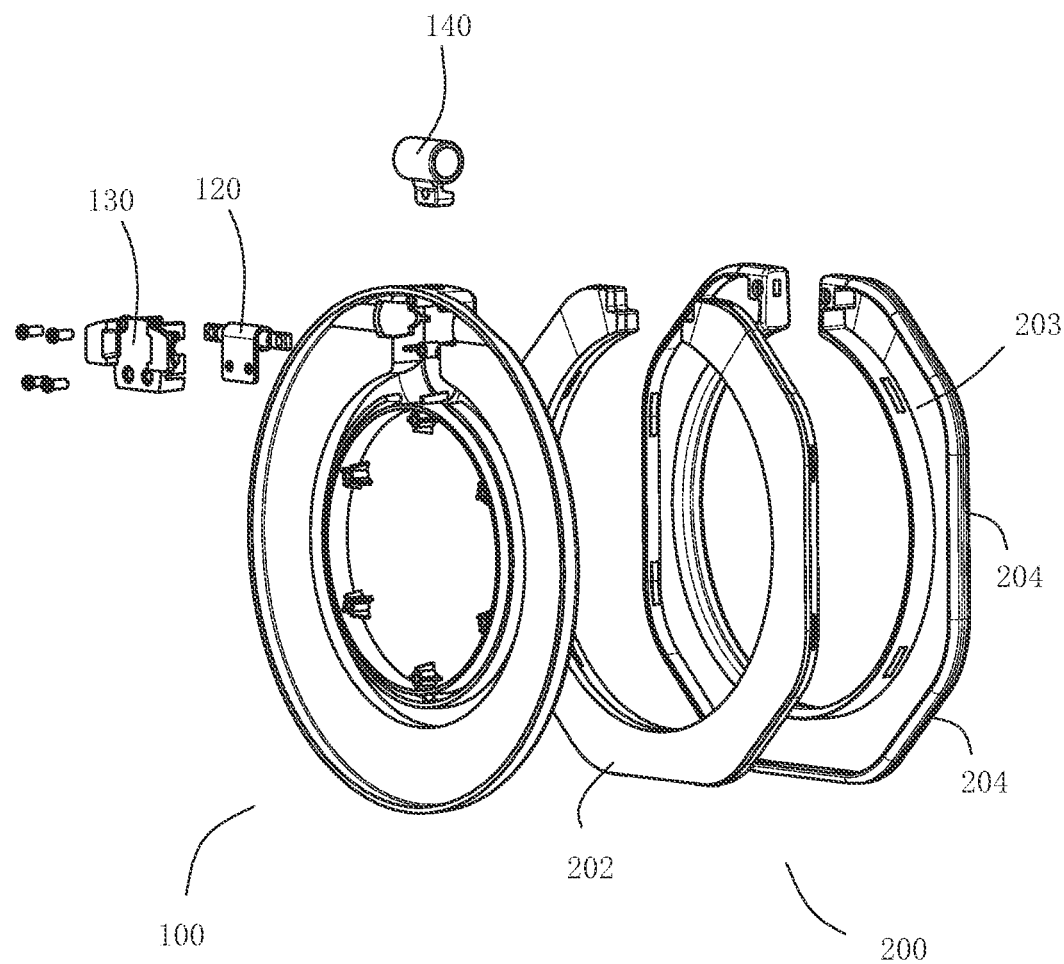
FIG. 2 is a schematic diagram of a breakdown structure of a turntable bracket in a first embodiment of the present invention in another angle of view.
Figure 3:
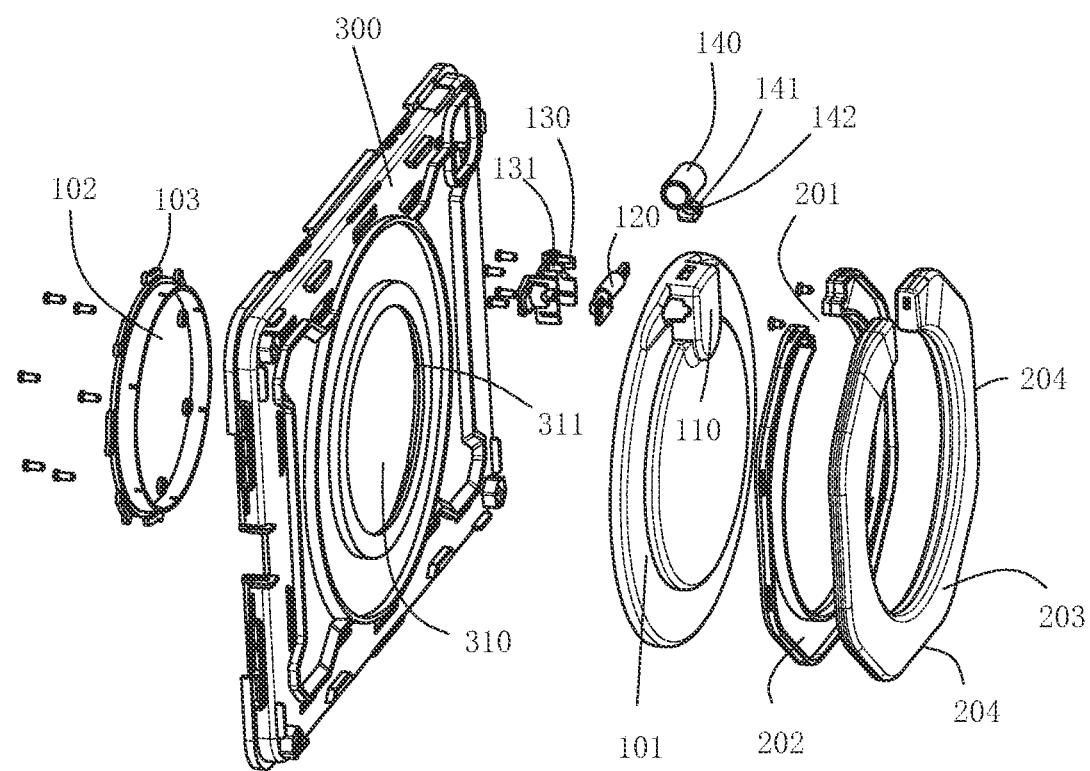
FIG. 3 is an exploded schematic diagram of an overall structure of a panel protecting shell in a second embodiment of the present invention.
Figure 4:
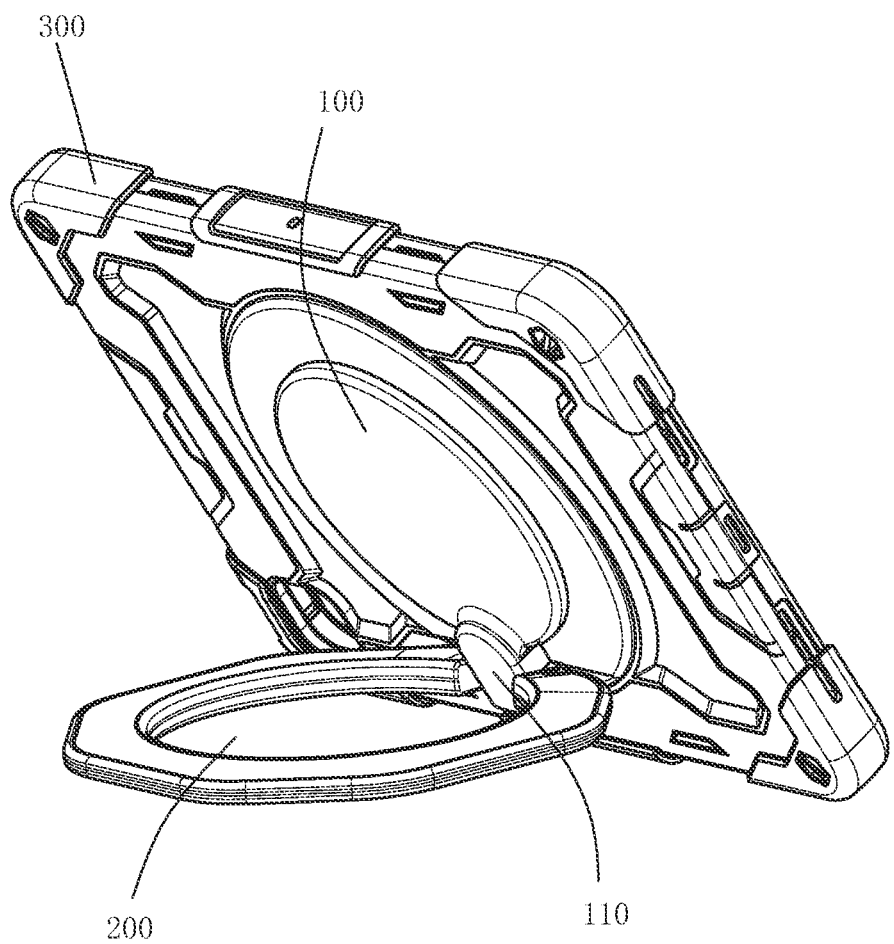
FIG. 4 is a structural schematic diagram of an unfolded bracket portion of a panel protecting shell in a second embodiment of the present invention.
Figure 5:
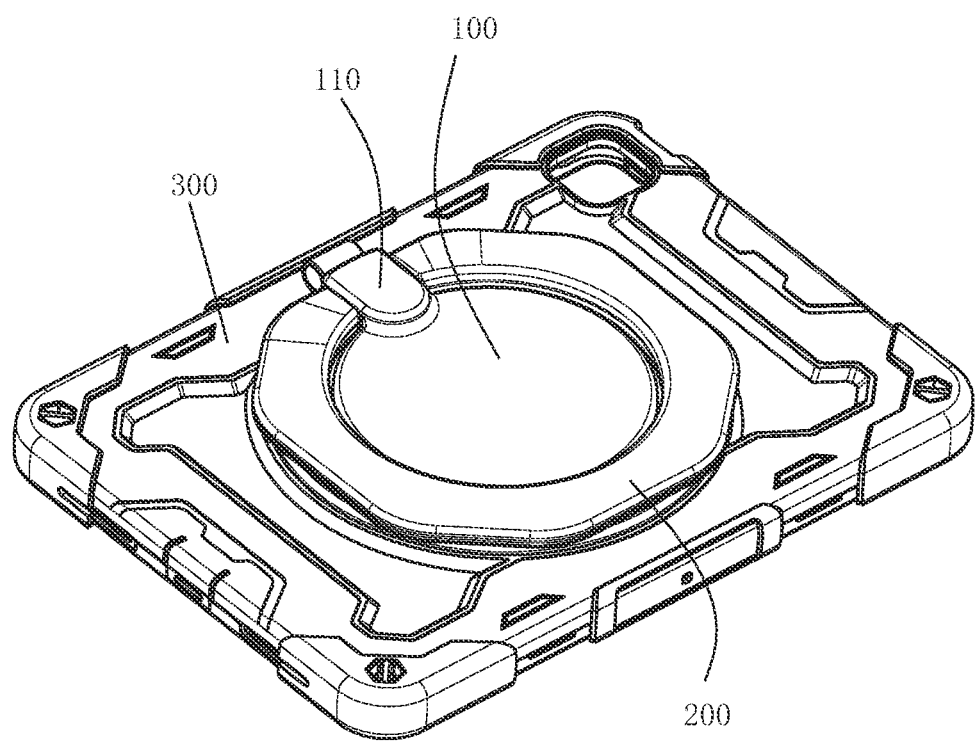
FIG. 5 is a schematic diagram of an overall structure of a panel protecting shell in a second embodiment of the present invention.
Figure 6:
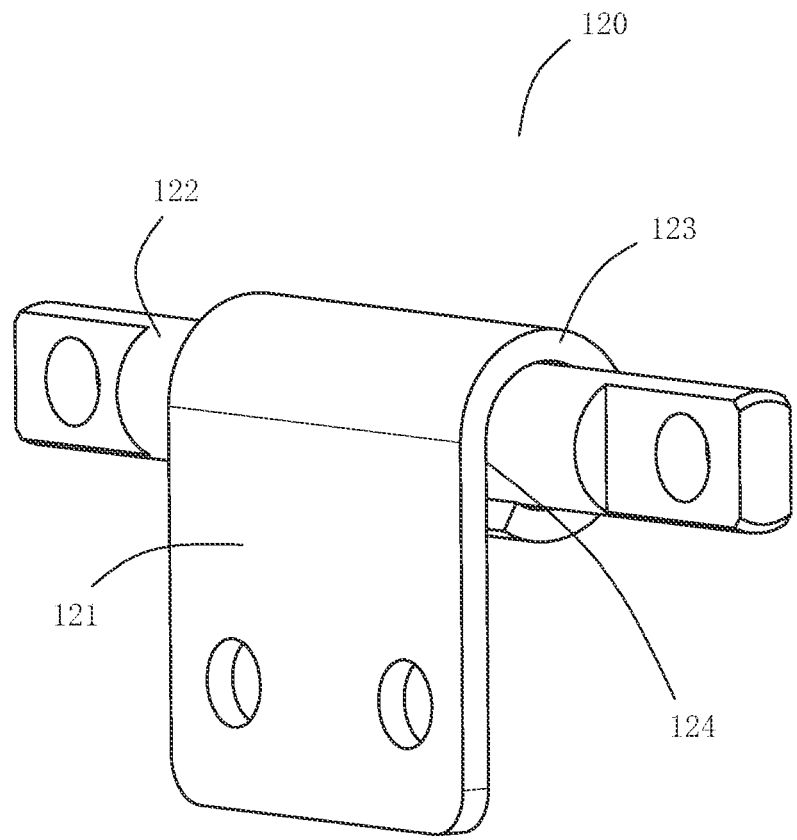
FIG. 6 is a schematic diagram of an overall structure of a turntable assembly in an embodiment of the present invention.

Referring to FIG. 1 to FIG. 6, provided is a turntable bracket, including a turntable portion 100 and a bracket portion 200 in hinged connection with the turntable portion 100, where the turntable portion 100 is provided with a protruding connecting seat 110, the connecting seat 110 is internally provided with a rotating shaft assembly 120 and a pressing plate assembly 130 for fixing the rotating shaft assembly 120; the rotating shaft assembly 120 includes a rotating shaft 122, two ends of which stretch out respectively from the connecting seat 110; and the bracket portion 200 is provided with disconnected connectors 201, the connectors 201 are formed in two sides of the connecting seat 110, and two ends of each of the connectors 201 are respectively connected with two ends of the rotating shaft 122.

According to the turntable bracket, the turntable portion 100 is provided with the protruding connecting seat 110 to mount the rotating shaft assembly 120, and the rotating shaft assembly 120 is embedded from a back surface of the connecting seat 110 and is compressed and fixed via the pressing plate assembly 130, so that it is convenient to assemble the turntable bracket, it is firmer to connect, and the service life is longer.

When the turntable bracket is mounted, first of all, the rotating shaft assembly 120 provided with the rotating shaft 122 is clamped into the connecting seat 110 from the back of the connecting seat 110, two ends of the rotating shaft 122 stretch out from two ends of the connecting seat 110 respectively, the pressing plate assembly 130 is clamped from the back of the connecting seat 110 and is connected and fixed via a screw, the screw penetrates through the compressing plate assembly 130 and the rotating shaft assembly 120 while is connected and fixed to the pressing plate assembly 130, and the rotating shaft assembly 120 is fixed to the connecting seat 110.

Two ends of the rotating shaft 122 stretch out and are fixedly connected with two ends of the disconnected connector 201 of the bracket portion 200. After the bracket portion 200 is partitioned, it can be in buckled connection to two end portions of the rotating shaft 122 at the connectors 201, and the two ends of the connector 201 are respectively located on two sides of the connecting seat 110, so that it is convenient to mount, detach and maintain.

In some embodiments of the present invention, the rotating shaft assembly 120 includes a mounting plate 121 and the rotating shaft 122, where an end portion of the mounting plate 121 is curled to form a rotating shaft sleeve 123, an inner circumference of the rotating shaft sleeve 123 is provided with a flat shaft sleeve stop position 124, the rotating shaft 122 is provided with a flatly arranged rotating stop position, and the rotating stop position fitting the shaft sleeve stop position 124 locks the rotating shaft 122.

In some embodiments of the present invention, the pressing plate assembly 130 is connected with the connecting seat 110 via a screw, and the screw penetrates through the pressing plate assembly 130 and the mounting plate 121 and is fixed to the connecting seat 110.

The screw penetrates through the pressing plate assembly 130 and is connected with the connecting seat 110, the front end of the screw penetrates through the mounting plate 121 and is fixed to the connecting seat 110 while the screw penetrates through the pressing plate assembly 130, thereby, the rotating shaft assembly 120 is mounted more stably.

The rotating shaft 122 rotates in the rotating shaft sleeve 123 on the mounting plate 121 and is positioned. When the rotating shaft stop position on the rotating shaft 122 fits the shaft sleeve stop position 124 on the inner circumference of the rotating shaft sleeve 123, the rotating shaft assembly 120 is self-locked, thereby achieving a steady supporting state.

In some embodiments of the present invention, a side surface of the connecting seat 110 is connected with a pen cap 140, a side surface of the pen cap 140 is provided with a pen cap mounting portion 141, a side surface of the connecting seat 110 is provided with a pen cap mounting hole 142, and the pen cap mounting portion 141 penetrates through the pen cap mounting hole 142 and is connected in the connecting seat 110.

In some embodiments of the present invention, the pressing plate assembly 130 is provided with a connecting column, the pen cap mounting portion 141 is provided with the pen cap mounting hole 142, and the connecting column penetrates through the pen cap mounting hole 142 and is connected with the pen cap 140.

The pressing plate assembly 130 is provided with the connecting column arranged parallel to the screw. When the pressing plate assembly 130 is propelled to mount the rotating shaft assembly 120, the connecting column is further propelled synchronously, penetrates through the pen cap mounting hole 142 and is connected with the pen cap mounting portion 141, so that the pen cap 140 made from a silica gel material is mounted on the connecting seat 110.

In some embodiments of the present invention, the turntable portion 100 includes a first turntable 101 and a second turntable 102, the first turntable 101 and the second turntable 102 being in buckled connection to mount the turntable portion 100.

In some embodiments of the present invention, several elastic clamping points 103 are arranged outside the second turntable 102 at an equal radian.

In some embodiments of the present invention, the bracket portion 200 includes a first bracket 202 and a second bracket 203. The first bracket 202 and the second bracket 203 are buckled to form the bracket portion 200. An outer frame of the bracket portion 200 includes several linear supporting edges 204, each of the linear supporting edges 204 enables an external contour of the bracket portion 200 to be polygonal, and a center of the bracket portion 200 is provided with a portable through hole.

According to an embodiment of a second aspect of the present invention, provided is a panel protecting shell using the turntable bracket, including a protecting shell body 300, where the protecting shell body 300 is provided with a turntable through hole 310, the turntable bracket is mounted at the turntable through hole 310, and the turntable bracket is mounted on two sides of the turntable through hole 310 in a buckled manner.

In some embodiments of the present invention, the turntable through hole 310 is internally provided with several slots 311, a periphery of the turntable portion 100 is provided with several elastic clamping points 103 at an equal radian, and each of the elastic clamping points 103 is embedded into the slot 311 to be positioned in a rotating process.

According to the panel protecting shell using the turntable bracket, the turntable through hole 310 is internally provided with the slots 311 and the elastic clamping points 103 of the turntable portion 100 matched to position the angle of the turntable portion 100, and meanwhile, the angle of the bracket portion 200 is positioned by opening the rotating shaft assembly 120 on the turntable bracket at an angle, so that the panel protecting shell is opened at any angle.

The first turntable 101 and the second turntable 102 are mounted in a buckled manner on two sides of the turntable through hole 310 formed in the panel protecting shell, a gap is reserved between the first turntable 101 and the second turntable 102 to accommodate an inner edge of the turntable through hole 310 of the panel protecting shell and to form a pivot based on a connecting portion between the first turntable 101 and the second turntable 102 to rotate.

The periphery of the turntable portion 100 is provided with several elastic clamping points 103 at an equal radian, the inner circumference of the turntable through hole 310 is provided with several slots 311, and in the rotating process of the turntable portion 100, each of the elastic clamping points 103 is embedded into the slot 311 with different radians, so that the positioning angle of the turntable portion 100 relative to the panel protecting shell is fixed.

The outer frame of the bracket portion 200 is provided with several linear supporting edges 204, the number of the linear supporting edges 204 is equal to that of the elastic clamping points 103 and that of the slots 311, and the linear supporting edges correspond to the elastic clamping points 103 and the slots 311 in position one by one, and therefore, the bracket portion is supported on a planar position to be placed via the linear supporting edges 204 arranged on the turntable portion 100 after the turntable portion 100 is positioned.

The center of the bracket portion 200 is provided with the portable through hole, and a part of the first turntable 101 protrudes to clamp the portable through hole of the bracket portion 200. At an unfolding opening of the bracket portion 200, a user can hold the portable through hole conveniently, so that it is more convenient to use.

What is claimed is:

1. A turntable bracket, including a turntable portion and a bracket portion in hinged connection with the turntable portion, where the turntable portion is provided with a protruding connecting seat, the connecting seat is internally provided with a rotating shaft assembly and a pressing plate assembly for fixing the rotating shaft assembly; the rotating shaft assembly includes a rotating shaft, two ends of which stretch out respectively from the connecting seat; and the bracket portion is provided with disconnected connectors, the connectors are formed in two sides of the connecting seat, and two ends of each of the connectors are respectively connected with two ends of the rotating shaft;

wherein the rotating shaft assembly includes a mounting plate and the rotating shaft, where an end portion of the mounting plate is curled to form a rotating shaft sleeve, an inner circumference of the rotating shaft sleeve is provided with a flat shaft sleeve stop position, the rotating shaft is provided with a flatly arranged rotating stop position, and the rotating stop position fitting the shaft sleeve stop position locks the rotating shaft.

2. The turntable bracket according to claim 1, wherein the pressing plate assembly is connected with the connecting seat via a screw, and the screw penetrates through the pressing plate assembly and the mounting plate and is fixed to the connecting seat.

3. A turntable bracket, including a turntable portion and a bracket portion in hinged connection with the turntable portion, where the turntable portion is provided with a protruding connecting seat, the connecting seat is internally provided with a rotating shaft assembly and a pressing plate assembly for fixing the rotating shaft assembly; the rotating shaft assembly includes a rotating shaft, two ends of which stretch out respectively from the connecting seat; and the bracket portion is provided with disconnected connectors, the connectors are formed in two sides of the connecting seat, and two ends of each of the connectors are respectively connected with two ends of the rotating shaft, wherein a side surface of the connecting seat is connected with a pen cap, a side surface of the pen cap is provided with a pen cap mounting portion, a side surface of the connecting seat is provided with a pen cap mounting hole, and the pen cap mounting portion penetrates through the pen cap mounting hole and is connected in the connecting seat.

4. The turntable bracket according to claim 3, wherein the pressing plate assembly is provided with a connecting column, the pen cap mounting portion is provided with the pen cap mounting hole, and the connecting column penetrates through the pen cap mounting hole and is connected with the pen cap.

5. The turntable bracket according to claim 4, wherein the turntable portion includes a first turntable and a second turntable, the first turntable and the second turntable being in buckled connection to mount the turntable portion.

6. The turntable bracket according to claim 5, wherein several elastic clamping points are arranged outside the second turntable at an equal radian.

7. The turntable bracket according to claim 5, wherein the bracket portion includes a first bracket and a second bracket; the first bracket and the second bracket are buckled to form the bracket portion; an outer frame of the bracket portion includes several linear supporting edges, each of the linear supporting edges enables an external contour of the bracket portion to be polygonal, and a center of the bracket portion is provided with a portable through hole.

8. A panel protecting shell using the turntable bracket according to claim 1, including a protecting shell body, where the protecting shell body is provided with a turntable through hole, the turntable bracket is mounted at the turntable through hole, and the turntable bracket is mounted on two sides of the turntable through hole in a buckled manner.

9. The panel protecting shell according to claim 8, wherein the turntable through hole is internally provided with several slots, a periphery of a turntable portion is provided with several elastic clamping points at an equal radian, and each of the elastic clamping points is embedded into the slot to be positioned in a rotating process.

\* \* \* \* \*